United States Patent
Goetz

[15] 3,654,692
[45] Apr. 11, 1972

[54] METHOD OF MAKING FRICTION DISC VARIATORS

[72] Inventor: Bernard Goetz, Colombes, France

[73] Assignees: Automobiles Peugeot, Paris; Regie Nationale Des Usines Renault, Billancourt, France

[22] Filed: Nov. 21, 1969

[21] Appl. No.: 878,671

[30] Foreign Application Priority Data

Feb. 7, 1969 France...................................6902820

[52] U.S. Cl..............................29/558, 29/DIG. 36, 51/323, 148/11.5, 192/107 R
[51] Int. Cl.........................................................B23p 13/04
[58] Field of Search....................29/558, DIG. 36, DIG. 19; 148/12.1, 11.5, 16.6; 51/323, 322, 326, 316, 290, 291; 192/107 R, 107 M, 107 T, 107 C

[56] References Cited

UNITED STATES PATENTS

| 1,743,623 | 1/1930 | Ross | 51/320 |
| 2,248,530 | 7/1941 | Granger et al. | 308/241 |
| 2,390,417 | 12/1945 | Bramberry | 148/12.1 |
| 2,577,818 | 12/1951 | Shaw | 51/290 |
| 2,927,673 | 3/1960 | Sand | 192/107 CP X |
| 2,932,205 | 4/1960 | Keesling | 51/323 X |
| 2,965,205 | 12/1960 | Winchell | 192/107 X |
| 3,073,424 | 1/1963 | Russell | 192/107 X |

OTHER PUBLICATIONS

Steel Processing for October, 1948, " How Surface Peening Improves Metal Parts," pp. 549– 551, 556

*Primary Examiner*—John F. Campbell
*Assistant Examiner*—Victor A. Di Palma
*Attorney*—Burns, Doane, Swecker & Mathis

[57] ABSTRACT

A method for treating surfaces of contact for a friction element operating in a liquid medium. The method comprises sand blasting the surface so as to form unevenness, thereafter nitriding the surface layer so as to increase the hardness and thereafter effecting a partial smoothing to eliminate the crests of the unevenness.

3 Claims, 2 Drawing Figures

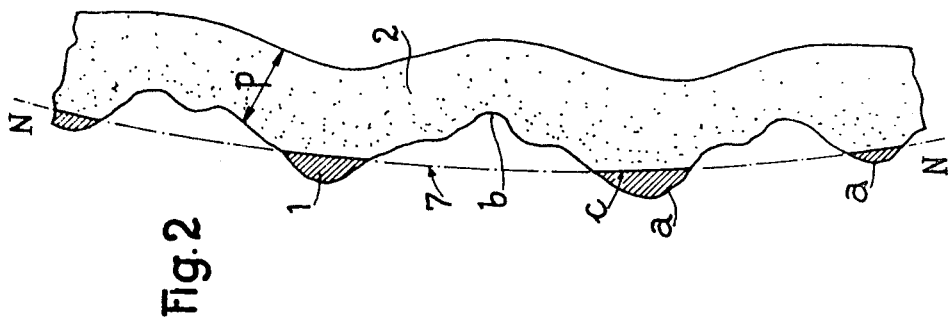
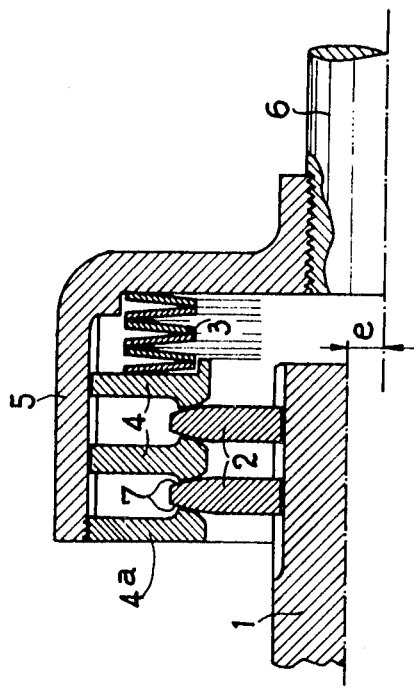

METHOD OF MAKING FRICTION DISC VARIATORS

The present invention relates to speed variators employing friction discs in a liquid medium and to the manufacture of these variators. In such variators, one or more discs connected to rotate with a driving shaft are gripped between rings connected to rotate with a driven or receiving shaft, the two shafts being parallel. A continuous variation in the distance between the driving shaft and receiving shaft produces the continuous variations in the speed ratio between the two shafts. The transmission of the torque is by friction in a liquid medium between the surfaces of the discs and those of the rings.

The state of the surfaces is therefore of great importance and it is known that the transmissible torque can be markedly increased if the expulsion of the film of oil in the zone of contact is encouraged. In French Pat. No. 1,499,403 it has been disclosed that a metallization of one of the surfaces, for example with molybdenum, produces an appreciable roughness which tears the film of oil and improves the performance of the variator.

The invention provides an improved method for treating the surface for friction elements in a liquid medium for speed variator which gives the same results but considerably increases the possibilities of the variator. The method according to the invention comprises the steps of sand blasting each surface of contact so as to form fine unevenness, thereafter nitriding the surface layer so as to increase the hardness thereof and thereafter effecting a partial smoothing operation, such as grinding or lapping, to eliminate the crests of the unevenness.

Further features and advantages of the invention will be apparent from the ensuing description with reference to the accompanying drawing.

In the drawing:

FIG. 1 is a diagrammatic partial axial sectional view of a speed variator according to which the improvement of the invention is applied, and FIG. 2 is a partial sectional view, on a scale larger than that of FIG. 1, of a portion of the surface of contact of a friction disc.

FIG. 1 shows partly and diagrammatically a speed variator of known type to which the improvement of the invention is applied. This variator comprises, slidably keyed on a driving shaft 1, a plurality of fiction discs 2 which are gripped by elastically yieldable means 3 between friction rings 4 slidably keyed (except the last disc $4^a$ which is fixed) in a sleeve 5 which is connected to rotate with a receiving or driven shaft 6 which is radially offset relative to the driving shaft a variable distance e.

According to the invention, the two surfaces of contact 7 of each disc are treated in the following manner.

These discs are manufactured from nitriding steel, for example the steel of the "AFNOR" grade 25 CR 13.

After machining, the surface 7, which comes in contact with the rings 4, $4^a$ in operation of the variator (FIG. 1), are sand blasted. This sand blasting is intended to create minute deformations having crests $a$ and hollows or cavities $b$ (FIG. 2) which result in a roughness capable of tearing the film of oil in the zone of contact.

A nitriding treatment is then carried out so as to increase the surface hardness of the disc. The treated layer has a certain depth $p$ which depends on the duration of the treatment and the hardness increases as the surface is approached.

After nitriding, the treated surfaces are partially smooth by any known method, such as grinding or lapping. For example, the disc surfaces may be smoothed by treating them in a barrel. This smoothing operation has for purpose to remove down to the level N—N, the crests $a$ which could otherwise break in the course of operation of the variator, there being a danger that the particles of metal torn off rapidly impair the apparatus when mixed with the oil. Consequently, the nitrided surface 7 has small faces or plateaux $c$ separated by small cavities $b$ and their linear dimensions are respectively of the order of 0.1 mm.

The following requirements should be fulfilled to obtain good results:

1. The depth p of the nitrided layer must be such that, after smoothing down to the level N—N, all the apparent small surfaces $c$ be still in this nitrided layer.

2. The smoothing must be limited so as to retain the hollow parts $b$ produced by the sand blasting which are essential for the expulsion of the oil.

Thus, it is possible to treat also or exclusively the rings 4 on the face or faces of contact.

Having now described my invention what I claim and desire to secure by Letters Patent is:

1. A method for treating a non-planar surface of contact of a friction-drive rotary element of a speed variator, said element being intended to rotate about an axis and operate and transmit torque in an oil medium to another rotary element rotating about another axis of rotation, said method comprising the steps of sand blasting said surface of contact so as to form fine unevenness comprising cavities and crests in the surface capable of tearing a film of said oil medium between friction-drive elements in operation of the speed variator, thereafter nitriding the surface to a first depth so as to increase the hardness thereof and thereafter effecting a partial smoothing of the nitrided surface to a second depth to remove an outermost part of the crests of the unevenness but retain cavities around the crests, said second depth being shallower than said first depth so that the crests from which said outermost part has been removed have plateaux which are within said depth of nitriding and are surrounded by cavities for the passage of said oil medium.

2. A method as claimed in claim 1, wherein, as a result of said sand blasting and smoothing steps said plateaux and cavities respectively have linear dimensions of substantially 0.1 mm.

3. A method as claimed in claim 1, wherein said smoothing is a grinding or lapping operation.

* * * * *